US006198560B1

United States Patent
Claringburn et al.

(10) Patent No.: US 6,198,560 B1
(45) Date of Patent: Mar. 6, 2001

(54) OPERATION OF OPTICAL MODULATORS

(75) Inventors: Harry R Claringburn, Nottingham; Paul A Callan, Loughborough, both of (GB)

(73) Assignee: Marconi Communications Limited (GB)

( * ) Notice: Subject to any disclaimer, the term of this patent is extended or adjusted under 35 U.S.C. 154(b) by 0 days.

(21) Appl. No.: 09/003,893

(22) Filed: Jan. 7, 1998

(30) Foreign Application Priority Data

Jan. 10, 1997 (GB) .................................................. 9700440

(51) Int. Cl.$^7$ ........................... H04B 10/04; H04B 10/02; G02F 1/03
(52) U.S. Cl. ........................... 359/187; 359/180; 359/181; 359/177; 359/249
(58) Field of Search ........................... 375/312; 359/249, 359/255, 180, 181, 177, 187

(56) References Cited

U.S. PATENT DOCUMENTS

| 3,708,797 | * | 1/1973 | Solomon et al. | ..................... 346/108 |
| 5,003,624 | | 3/1991 | Terbrack et al. | . |
| 5,170,274 | * | 12/1992 | Kuwarta et al. | ..................... 359/182 |
| 5,383,046 | * | 1/1995 | Tomofuji et al. | ..................... 359/176 |

FOREIGN PATENT DOCUMENTS 0 631 169 A2   12/1994   (EP) .

* cited by examiner

Primary Examiner—Jason Chan
Assistant Examiner—M. R. Sedighian
(74) Attorney, Agent, or Firm—Kirschstein, et al.

(57) ABSTRACT

A method of, and an apparatus for, operating an optical modulator employ an optical attenuation versus voltage response which is cyclic and which includes an input to which the application of a bias voltage moves the modulator's response along the voltage axis to maintain the modulator's response at a desired voltage position. The apparatus comprises a bias voltage generator for generating a bias voltage which comprises the sum of a first and a second voltage component. The first component is fixed during normal operation and is selected to correspond to the expected bias voltage required for maintaining the modulator's response at a desired voltage position. The apparatus further comprises circuitry for detecting the position of the modulator's response and adjusting the second voltage component to maintain the response at the desired voltage position. Additionally, the apparatus includes a control circuit for detecting when the bias voltage approaches the limit of the available bias voltage range; a fixed voltage generator for adjusting the first voltage component until it is equal to the sum of the bias voltage and a voltage corresponding to one or more half cycles of the modulator's response; and a variable voltage generator for setting the second voltage component to zero.

22 Claims, 3 Drawing Sheets

OPERATION OF OPTICAL MODULATORS

FIELD OF THE INVENTION

This invention relates to the operation of optical modulators and in particular, although not exclusively, to the operation of a Mach Zehnder type optical modulator in an optical telecommunications network operating with a synchronous digital hierarchy (SDH) format.

BACKGROUND OF THE INVENTION

In an optical telecommunications network data is transmitted in the form of pulses of light, in which a pulse of light represents a logic state "1" and the absence of a pulse, or a pulse of different magnitude, represents a logic state "0". In low data rate systems it is known to produce the pulses of light by driving a solid state laser using a signal which is related to the data to be transmitted. Lasers, however, can "chirp"; that is they no longer produce pulses of light of a single wavelength. This spreading of the wavelength of light results in dispersion of the pulses as they travel along optical fibres which can ultimately limit the operating frequency and/or range of the optical network.

To overcome the problems associated with laser "chirp" it is known, when operating at high data rate, to run the laser continuously and externally modulate the continuous light output using an optical modulator. The optical modulator applies variable attenuation to light passing through it, the amount of attenuation being dependent upon an electrical signal applied to a control input. One example of such a modulator is a lithium niobate Mach Zehnder modulator which has an optical transfer response (that is optical attenuation versus the voltage applied to the control input) which is approximately sinusoidal in shape. In an optical telecommunications network in which digital data is being transmitted it is often required that the data fully modulates the light output, that is light should pass substantially unattenuated for a logic state "1" and be completely attenuated for a logic state "0" or vice versa. To achieve such modulation requires the modulator to be operated at voltages which correspond to the maxima and minima in the optical transfer response.

In practice whilst the shape of the modulator's transfer response may be known its relative position along the voltage axis drifts resulting in distortion of the transmitted signal. As described in U.S. patent Ser. No. 5,400,417 such drift can be compensated for by applying a DC bias voltage $V_{bias}$ to a second input of the modulator to maintain the modulator's transfer response at the desired voltage position. Control circuitry is provided which monitors the optical output of the modulator to determine by how much the modulator's transfer response has drifted and the DC bias voltage is adjusted accordingly to maintain the modulator's transfer response at the desired voltage position. Whilst such an arrangement is found to track any drift in the modulator's response, a problem can arise if the transfer response drifts by an amount which would require a bias voltage which exceeds the maximum bias voltage available as set by the power supply of the control circuitry or by constraints in the modulator.

When the modulator's response drifts by an amount such that the bias voltage required for correct operation exceeds the available bias voltage range it is necessary to reset the system.

For an optical modulator which has a transfer response which is cyclic it has been proposed in U.S. Pat. No. 5,003,624 to reset the bias voltage by an amount corresponding to one cycle of the response. In this way the modulator is reset to a corresponding portion of its transfer response. However with such a system a loss of the transmitted data will occur during the period that the voltage is adjusted. In the case of some transmission systems, for example the analogue transmission of television signals, this may be acceptable. In digital telecommunication networks however, such as those operating using a synchronous digital hierarchy (SDH) format, there are strict constraints on performance. In particular in high bit rate systems, such as would typically use external optical modulators of this type, resetting the system could corrupt unacceptably large quantities of data.

The present invention addresses the technical problem of resetting an optical modulator without causing appreciable disruption to the data and in particular concerns the problem of resetting a Mach Zehnder optical modulator which is used in an optical telecommunications network operating with a synchronous digital hierarchy (SDH) format.

SUMMARY OF THE INVENTION

According to a first aspect of the invention there is provided a method of operating an optical modulator of a type which has an optical attenuation versus voltage response which is cyclic, the optical modulator including an input to which the application of a bias voltage moves the modulator's response along the voltage axis, the method comprising:

generating a bias voltage which comprises the sum of a first and a second voltage component, wherein the first voltage component is fixed during normal operation and is selected to correspond to the expected bias voltage required for maintaining the modulator's response at a desired voltage position;

detecting the position of the modulator's response and adjusting the second voltage component to maintain the response at the desired voltage position; the method further comprising:

detecting when the bias voltage approaches the limit of the available bias voltage range;

adjusting the first voltage component until it is equal to the sum of the bias voltage and a voltage corresponding to one or more half cycles of the modulator's response; and setting the second voltage component to zero.

Advantageously the method further comprises adjusting the first voltage component slowly enough for the second voltage component to track the change and thereby maintain the modulator's response at the desired voltage position until the second voltage component is set to zero.

A particular advantage of using a bias voltage which comprises a first voltage component which is fixed and a second voltage component is that the bias voltage can be reset with minimal disruption to the modulator's operation by adjusting the first voltage component to the desired reset bias voltage and then setting the second voltage component to zero. This is because during the period in which the first voltage component is adjusted the operation of the modulator is unaffected as the second voltage component tracks the change, thereby maintaining the modulator's response at the desired voltage position. The time taken to adjust the first voltage component is thus irrelevant provided that the modulator's drift is sufficiently slow that a reset will not be required for a relatively long time compared with the operation of the method.

Setting the second voltage component to zero thus determines the effective reset time (i.e., the time during which any disruption could occur) and this can be achieved almost instantaneously and is limited only by the slew rate of the generator used to generate the second voltage component.

Preferably the method comprises resetting the bias voltage by an amount which corresponds to an even number of half cycles of the modulator's response such that the modulator will be reset to an equivalent position on a different cycle of the response. The modulator will then continue to operate without disruption to the data applied to the modulator.

Alternatively the method comprises resetting the bias voltage by an amount which corresponds to an odd number of half cycles and inverting data applied to the modulator. Although the data needs to be inverted such a method is found to be advantageous as it enables a faster reset since the second voltage component can be set to zero from a smaller voltage.

When the modulator is operated with a data format which includes overhead capacity the method advantageously comprises setting the second voltage component to zero during the transmission of the overhead capacity to minimise disruption to the data applied to the modulator. In a preferred application of the invention the data format comprises a synchronous digital hierarchy (SDH) format comprising frames each of which comprises a plurality of payload and overhead data portions and the method further comprises setting the second voltage component to zero during the transmission of the first overhead portion of the SDH frame thereby minimizing disruption of the payload. Advantageously with such a data format the second voltage component is set to zero in dependence on the SDH frame-rate signal.

According to a further aspect of the invention there is provided an apparatus for operating an optical modulator of a type having an optical attenuation versus voltage response which is cyclic, the optical modulator including an input the application of a bias voltage to which moves the modulator's response along the voltage axis, the apparatus comprising:

a bias voltage generator for generating a bias voltage which comprises the sum of a first and a second voltage component, wherein the first voltage component is fixed during normal operation and is selected to correspond to the expected bias voltage required for maintaining the modulator's response at a desired voltage position;

means for detecting the position of the modulator's response and adjusting the second voltage component to maintain the response at the desired voltage position;

the apparatus further comprising:

means for detecting when the bias voltage approaches the limit of the available bias voltage range;

means for adjusting the first voltage component until it is equal to the sum of the bias voltage and a voltage corresponding to one or more half cycles of the modulator's response; and means for setting the second voltage component to zero.

In a preferred apparatus the means for adjusting the first voltage component is operable to reset the bias voltage by an amount which corresponds to an even number of half cycles of the modulator's response. Such apparatus ensures that the modulator will continue to operate without disruption to the data being transmitted.

In an alternative arrangement the means for adjusting the first voltage component is operable to reset the bias voltage by an amount which corresponds to an odd number of half cycles of the modulator's response and further comprises means for inverting data applied to the modulator.

Advantageously the means for adjusting the first voltage component is operable to adjust the first voltage component slowly enough for the second voltage component to track the change and thereby maintain the modulator's response at the desired voltage position When the format of data applied to the modulator includes overhead capacity the means for setting the second voltage component to zero is preferably operable to set the second voltage component to zero during the transmission of the overhead capacity.

When the data format comprises a synchronous digital hierarchy (SDH) format which comprises frames each of which comprises a plurality of payload and overhead data portions, the means for setting the second voltage component to zero is operable during the transmission of the first overhead portion of the SDH frame and advantageously in dependence on the SDH frame-rate signal.

Preferably the bias voltage generator comprises a first voltage component generator, a second voltage component generator and summing means for summing the two voltage components.

In a particularly preferred embodiment of the invention the second voltage component generator comprises two voltage generators and switching means for selectively switching between the voltage generators during resetting. A particular advantage of generating the second voltage component in this way is that it is possible to set this voltage component to zero virtually instantaneously, thereby minimizing disruption to any transmitted data. This is advised by using one of the voltage generators to track any change of the modulator's response as described and setting the other generator to zero. The final stage of the reset procedure is to switch between voltage generators thereby setting the second voltage component to zero. The time taken to set this voltage component to zero is independent of the slew rate of the voltage generator and is determined by the capacitance of the modulator's input and the impedance associated with the second voltage generator.

According to yet a further aspect of the invention there is provided in a synchronous digital hierarchy (SDH) telecommunications network of a type in which data is transmitted using an optical modulator which has an optical attenuation versus voltage response which is cyclic and which includes an input to which the application of a bias voltage moves the modulator's response along the voltage axis, a method of operating this optical modulator; comprising:

generating a bias voltage;

detecting the position of the modulator's response and adjusting the bias voltage to maintain the modulator's response at a desired voltage position;

detecting when the bias voltage approaches the limit of available bias voltage range; and resetting the bias voltage during an overhead portion of the SDH format by an amount corresponding to one or more half cycles of the modulator's response.

Advantageously the bias voltage is reset during the transmission of the first overhead portion of an SDH frame and preferably in dependence on the SDH frame-rate signal. With such a method it is advantageous to suppress any resulting out-of-frame (OOF) event being reported to the receiving equipment's management system.

BRIEF DESCRIPTION OF THE DRAWINGS

A method and apparatus in accordance with the present invention will now be described by way of example only with reference to the accompanying drawings in which.

DETAILED DESCRIPTION OF THE INVENTION

Figure 1:
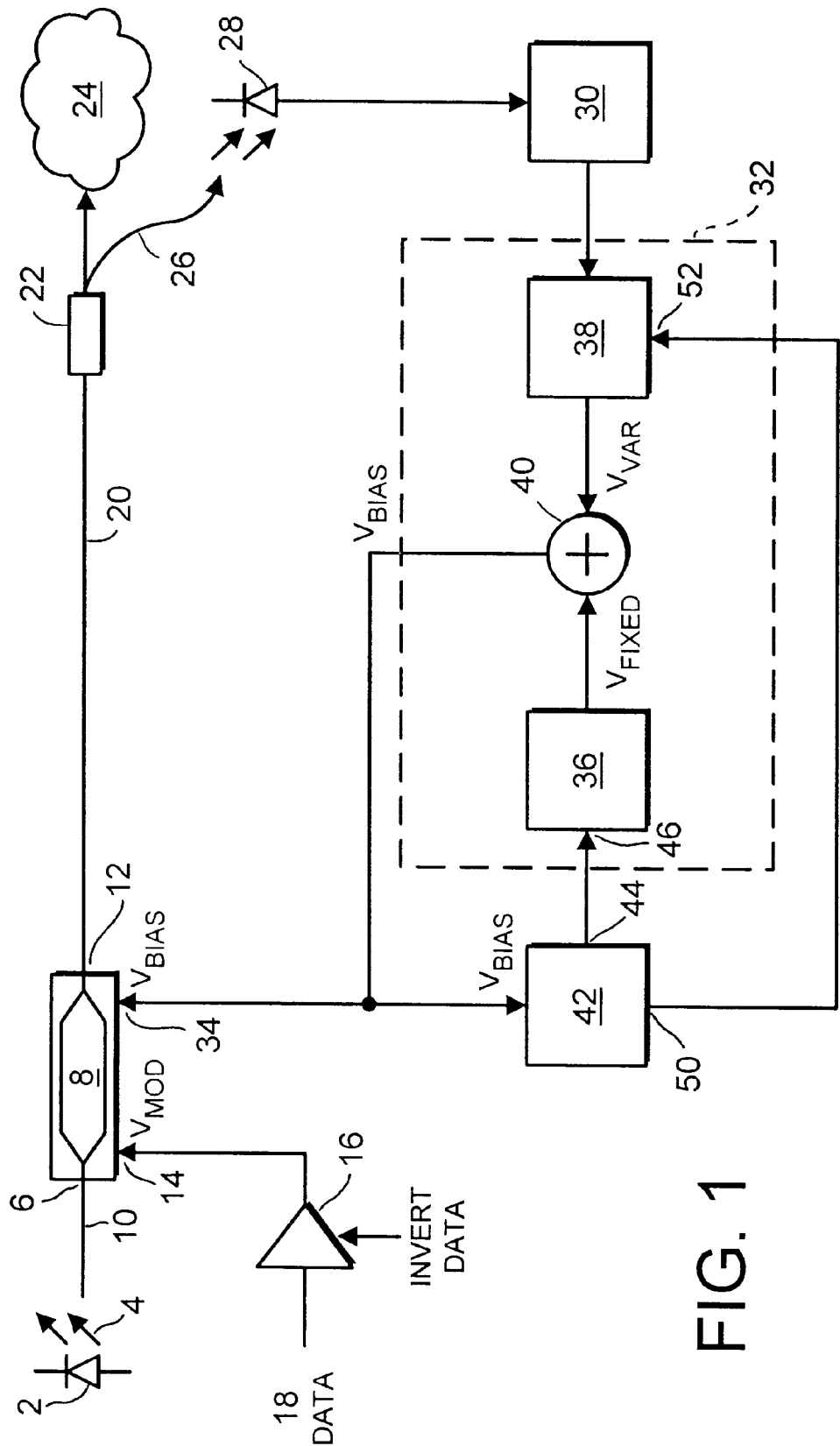
FIG. 1 is a schematic representation of an optical modulator and apparatus in accordance with the invention.

Referring to FIG. 1 there is shown a laser 2 which is driven to produce a continuous light output 4 which is coupled to the optical input 6 of an optical modulator 8 by an optical fibre 10. The optical fibre 10 is polarization maintaining to ensure that light entering the modulator 8 is of a known polarization. The optical modulator 8 is a lithium niobate Mach Zehnder type which produces a modulated light output at an optical output 12 in response to an electrical signal $v_{mod}$ applied to a control input 14.

The modulator 8 has an optical attenuation versus voltage $v_{mod}$ response which is cyclic and generally sinusoidal in shape. It will be appreciated that the invention also applies to other types of optical modulators having different optical responses, provided the response is cyclic and the voltage corresponding to one cycle is known.

The electrical signal $v_{mod}$ is generated by a driver circuit 16 in response to data applied to an input 18. The modulated light appearing at the optical output 12 is transmitted along an optical fibre 20, which is of a single mode type, into an optical splitter 22. The majority of the light, typically 95–99%, passes into an optical telecommunications network 24. The remaining fraction of the light, 5–1% passes into an optical fibre 26 and is utilised to maintain the optical modulator's response at a desired voltage position. It will be appreciated that the relative proportion of light passing to the network 24 and that utilised for the control of the optical modulator 8 is not critical, the criteria being to monitor the optical output without substantially affecting the performance of the optical network 24.

A PIN photo-diode 28 coupled to the optical fibre 26 converts the modulated light into an electrical signal which is utilized by a bias voltage control circuit 30. The bias voltage control circuit 30 determines by how much the optical modulator's response has drifted from the desired position. The output of the bias voltage control circuit 30 is used to control a bias voltage generator 32 which generates a bias voltage $v_{bias}$ which is applied to a second input 34 of the optical modulator 8. The application of a voltage to the input 34 has the effect of moving the optical modulator's optical attenuation versus voltage response along the voltage axis. The control circuit 30 is such that it tracks any drift in the optical modulator's response and adjusts the bias voltage generator 32 in dependence on the amount of drift to maintain the response at the desired voltage position.

One method by which the control circuitry 30 can track drift of the modulator's response is to further modulate the optical output of the modulator using a time varying signal whose modulation frequency is much lower than the frequency components of the data being transmitted. With such an arrangement the control circuit 30 includes a phase sensitive detector which is operated at the modulation frequency and is used to demodulate the optical output to provide a signal indicative of the position of the modulator's transfer response along the voltage axis. The particular method by which the control circuit 30 determines by how much the bias voltage needs to be adjusted is not critical to the invention and other control methods can be used which may or may not utilise the optical output of the modulator.

The bias voltage $v_{bias}$ comprises two voltage components; a fixed voltage component $v_{fixed}$ which is generated by a fixed voltage generator 36 and a variable voltage component $v_{var}$ which is generated by a variable voltage generator 38. The two voltage components are summed together using a summing circuit 40 to produce the bias voltage $v_{bias}$ such that $$v_{bias} = v_{fixed} + v_{var}.$$

When the system is initially installed the fixed bias voltage component $v_{fixed}$ is set to a value which corresponds to the value which is expected to be required to operate the modulator at the desired voltage position. The value for this voltage can be determined empirically for the modulator prior to installation. During normal operation of the system the fixed voltage component $v_{fixed}$ remains fixed. The fixed voltage component is only altered as part of the bias voltage reset as described below. In contrast the variable voltage component $v_{var}$ is continuously adjusted in response to the control circuit 30 to compensate for any drift in the optical modulator's response.

The bias voltage $v_{bias}$ is also applied to a reset control circuit 42 which is operative to reset the system when the bias voltage $v_{bias}$ approaches the limits of the available bias voltage range. The bias voltage reset procedure comprises the following steps.

When the reset control circuit 42 detects that the bias voltage $v_{bias}$ either exceeds a maximum bias voltage $v_{max}$ or that it is below a minimum bias voltage $v_{min}$ ($v_{min}$ and $v_{max}$ being the predetermined limits for the acceptable bias voltage range) it generates a control signal at an output 44 which is applied to a control input 46 of the fixed voltage generator 36. The control signal instructs the fixed voltage generator 36 to change the fixed voltage component $v_{fixed}$ to a voltage corresponding to $v_{bias}+v_{2\pi}$ when the bias voltage is below the lower limit $v_{min}$ and to a voltage $v_{bias}-v_{2\pi}$ when the bias voltage exceeds the upper limit $v_{max}$, where the voltage $v_{2\pi}$ corresponds to one cycle of the modulator's response.

On receiving such a control signal the fixed voltage generator 36 gradually increases or decreases the fixed voltage component until it is equal to $v_{bias}\pm v_{2\pi}$. The rate at which the fixed voltage component is changed is sufficiently slow for the bias control circuit 30 to track and adjust the variable voltage component $V_{var}$ such that the bias voltage $v_{bias}$ applied to the input 34 remains substantially constant, thereby maintaining the modulator's response at the desired voltage position. Once the fixed voltage component has been altered to its new value the variable voltage component $v_{var}$ will have been set to a value corresponding to $+v_{2\pi}$ or $-v_{2\pi}$, depending on whether $v_{bias}$ has exceeded $v_{min}$ or $v_{max}$.

The new value, $v_{bias}\pm v_{2\pi}$, for the fixed voltage component corresponds to the bias voltage required to operate the modulator at an equivalent voltage position on an adjacent cycle of the response. The final step of the bias voltage reset is that the reset control circuit 42 sends a clear signal from a second output 50 to an input 52 of the variable voltage generator 38 instructing the variable voltage generator to set the variable voltage component to zero. When the variable voltage component $v_{var}$ is set to zero the modulator's response jumps to an equivalent position on an adjacent cycle of the response and continues to operate without significant disruption to the data being transmitted. It will be appreciated that during the reset procedure the bias voltage $v_{bias}$ is reset by an amount $v_{2\pi}$ which corresponds to one cycle of the modulator's response.

In an alternative arrangement the reset circuit is operative to adjust the fixed voltage portion $v_{fixed}$ until it has a value which corresponds to $v_{bias}+v_\pi$ or to a value corresponding to $v_{bias}-v_\pi$, where $v_\pi$ corresponds to half a cycle of the modulator's response. When the variable voltage portion is set to zero the modulator's response jumps to an opposite portion of the response on an adjacent cycle and the data applied to the driver circuit 16 is logically inverted to ensure the system continues to operate without disruption to the transmitted data. In such an arrangement the bias voltage $v_{bias}$ is reset by an amount which corresponds to one half cycle of the modulator's response.

In summary, all of the embodiments described comprise resetting the bias voltage by an amount which corresponds to one or more half cycles of the modulator's response.

A particular advantage of using a bias voltage $v_{bias}$ which comprises fixed $v_{fixed}$ and variable $v_{var}$ voltage components is that the bias voltage can be reset with minimal disruption to the modulator's operation by adjusting the fixed component $v_{fixed}$ to the desired reset bias voltage and then setting the variable voltage component $v_{var}$ to zero. This is because during the period in which the fixed voltage component $v_{fixed}$ is adjusted the operation of the modulator is unaffected as the variable voltage component $v_{var}$ tracks the change, thereby maintaining the modulator's response at the desired voltage position. The time taken to adjust $v_{fixed}$ is thus irrelevant provided that the modulator's drift is sufficiently slow that a reset will not be required for a relatively long time compared with the operation of the circuit.

Setting the variable voltage component to zero thus determines the effective reset time (i.e., the time during which any disruption could occur) and this can be achieved almost instantaneously and is limited only by the slew rate of the variable voltage generator. In the case where the bias voltage is reset by an amount corresponding to a half cycle of the modulator's response the effective reset time is reduced as the variable voltage component is reset (set to zero) by a smaller amount.

Figure 2:
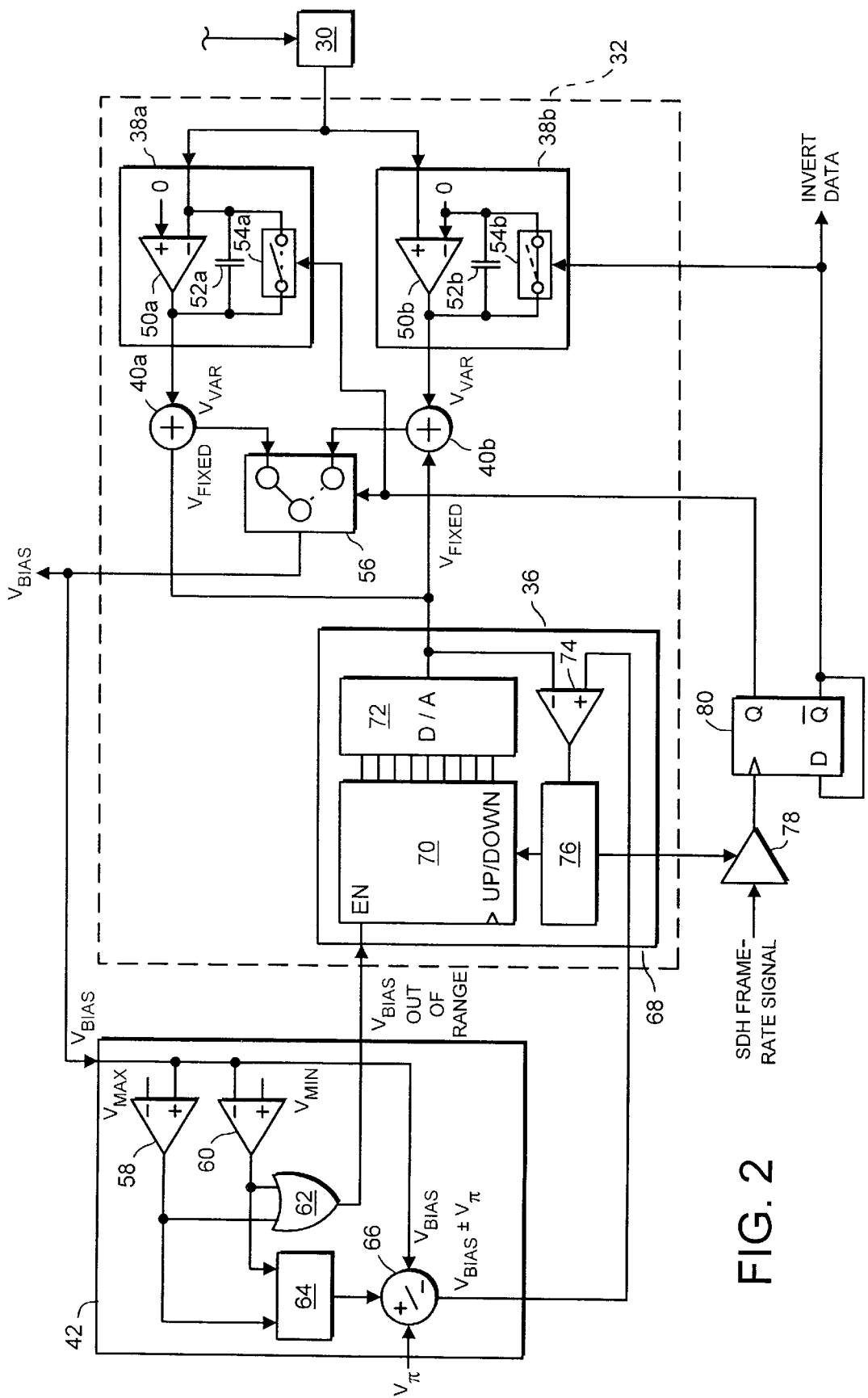
FIG. 2 is a schematic representation of an optical modulator and apparatus for use in a telecommunications network operating with synchronous digital hierarchy (SDH) format data.

Referring to FIG. 2 there is shown a preferred embodiment of the invention which is suitable for use in a 2.5 GBit/s Synchronous Digital Hierarchy (SDH) optical telecommunications network and which is operative to reset the bias voltage by an amount $v_\pi$ which corresponds to half a cycle of the modulator's response.

Two variable voltage component generators 38a and 38b are provided. Each of the voltage generators comprises a respective integrating circuit which comprises an operational amplifier 50a, 50b having a capacitor 52a, 52b connected between its output and one of its inputs. The second input of each operational amplifier 50a, 50b is connected to a reference voltage, which in the embodiment illustrated is zero volts, which is selected to have a value which corresponds to a value which is expected when the modulator's response is at the required voltage position. The operation of the voltage generators 38a, 38b is dependent on the sign of the slope of the portion of the optical modulator's response. In the embodiment shown the voltage generator 38a is an inverting integrating comparator and is operative to work on the positive slope of the optical modulator's response whilst the generator 38b is a non-inverting integrator and is operative to work on the negative slope of the optical modulator's response. At any given instant, the bias voltage $v_{bias}$ which is applied to the input 34 is the sum of the fixed voltage component $v_{fixed}$ and the variable voltage component $v_{var}$ generated by either the voltage generator 38a or 38b. The selection of the currently active voltage generator is determined by an analogue switch 56.

Each of the variable voltage component generators 38a, 38b has a switch 54a, 54b connected across the respective capacitor 52a, 52b. When a generator is not in operation the switch is closed so as to short the capacitor such that the generator output is zero volts.

The bias voltage control circuit 42 comprises two comparators 58 and 60, to which the bias voltage is applied to the first input and the maximum and minimum acceptable bias voltage values are applied to the second inputs. The voltage limits $v_{max}$ and $v_{min}$ represent the acceptable limit for the bias voltage. If the bias voltage $v_{bias}$ rises above $v_{max}$ the output of the comparator 58 will change state. Likewise, if the bias voltage falls below $v_{min}$ the output of comparator 60 will change state. An OR gate 62 connected to the outputs of the comparators 58 and 60 produces a change of output state whenever the bias voltage $v_{bias}$ goes outside the acceptable bias voltage range $v_{min}$ to $v_{max}$.

The control circuitry 42 further includes logic circuitry 64 which, when it is detected that the bias voltage goes out of range, activates a summing circuit 66 which adds or subtracts from the bias voltage the voltage $v_\pi$ which is equivalent to one half cycle of the optical modulator's response. This voltage value is applied to an input 68 of the fixed voltage component generator 36. The fixed voltage component generator 36 comprises an up/down counter 70 whose digital output is connected to a digital-to-analogue converter 72 at whose output the fixed voltage component is generated. The generator 36 also includes a comparator 74 to which the required fixed voltage portion $v_{bias}\pm v_\pi$ is applied to a first input and the current fixed bias voltage component $v_{fixed}$ is applied to the second input.

Whenever the fixed voltage generator 36 receives a control signal at the input 46 the counter 70 is swept until the comparator detects that the fixed voltage component is equal to the voltage $v_{bias}\pm v_\pi$. Once the fixed voltage is equal to the required value the switch 56 is activated to switch between the variable voltage generators 38a, 38b. In the embodiment illustrated, which is for use with SDH data, the switching between the first and second variable voltage generators 38a, 38b is initiated by the frame-rate signal using a gate 78 and latch 80. As is known, the frame-rate signal is a signal which is synchronised with the SDH frame and generally denotes the beginning of an SDH frame though the edge of this signal need not be at the beginning of the frame.

A particular advantage of using the two variable voltage generators 38a, 38b and an analogue switch 56 is that it is possible to set the variable voltage portion to zero virtually instantaneously, thereby minimizing disruption to any transmitted data. This is because the time taken to set this voltage component to zero is independent of the slew rate of the op-amp 50a, 50b, and is determined by the capacitance of the modulator's input 34 and the impedance associated with the variable voltage generator.

Figure 3:
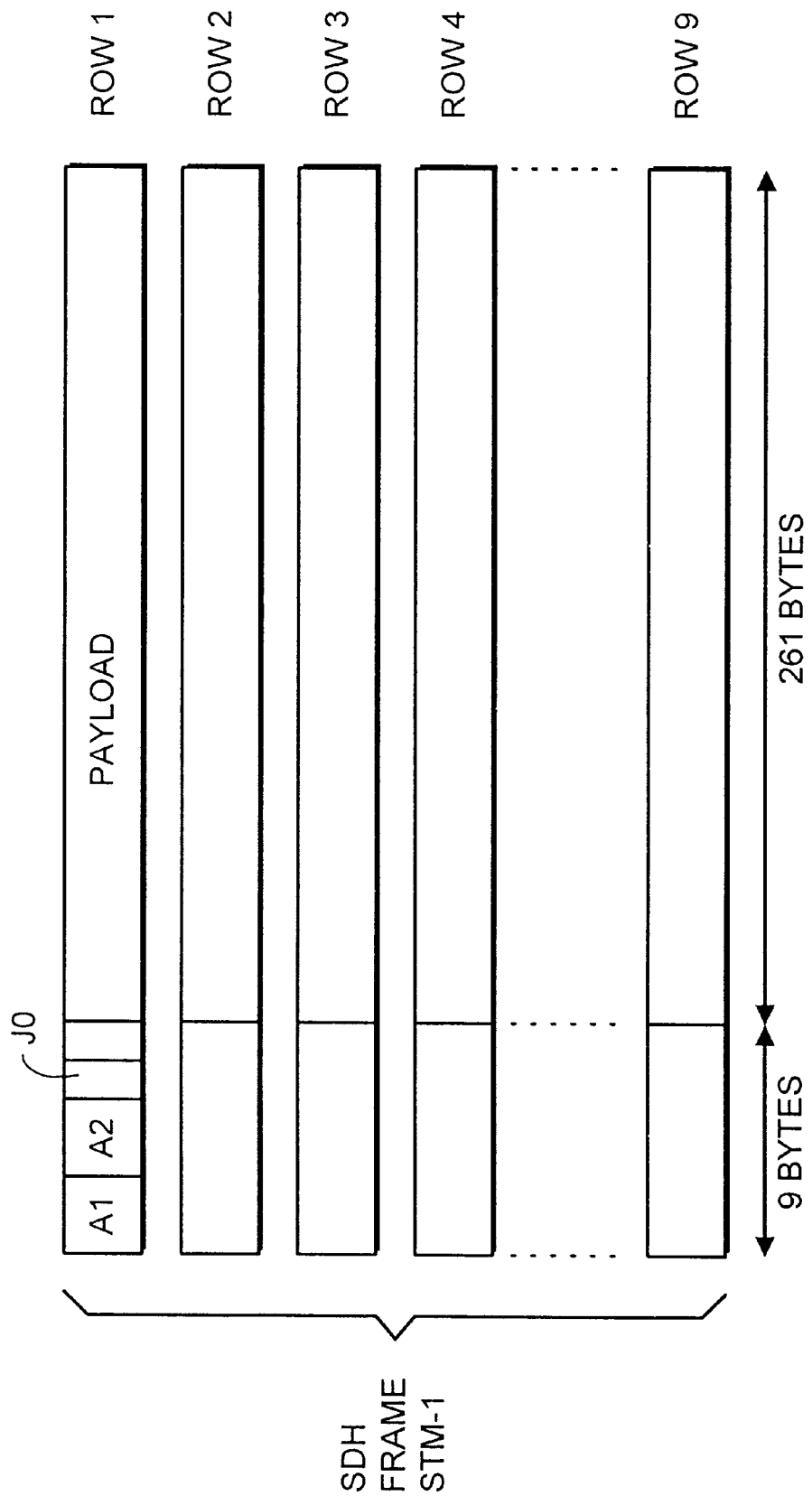
FIG. 3 is a schematic representation of a synchronous digital hierarchy (SDH) data frame.

Referring to FIG. 3 there is shown an STM-1 SDH frame which comprises nine rows, each of two hundred and seventy bytes, in which each row comprises nine bytes of overhead data followed by two hundred and sixty-one bytes of payload data. The first six bytes of the overhead are referred to as the frame word, and comprise three bytes of A1 and three bytes of A2, which are used to align the SDH frame at the receiving equipment. The last three bytes comprise a section trace byte JO and two bytes for national use. To avoid disruption to payload data, the modulator bias voltage is reset when the overhead bytes are being transmitted. More particularly, the bias voltage is reset during the period of overhead bytes of the first row of an SDH frame during A1 and A2 bytes. The reason for choosing this period is twofold. Firstly, the loss of these overhead bytes in one frame only will not adversely affect the transmission except for an out-of-frame (OOF) signal being generated by the receiving equipment management software. Other overhead periods contain potentially more sensitive data which it is preferable not to disturb. Secondly, in many SDH transmission systems the frame-rate signal used for indicating the frame position (sometimes referred to as the frame pulse), is often located near the beginning of the overhead bytes; typically 309 nanoseconds before the start of the first payload bytes. Resetting in dependence on the frame pulse therefore provides 309 nanoseconds for the modulator's transfer response to be realigned into the new bias position before the onset of payload bytes.

The resulting out-of-frame (OOF) event which will be reported to the receiving equipment's management system can be suppressed by software, since it is known in advance that a bias reset is about to occur and as a result it is possible to alert the receiver to expect such an event.

It will be appreciated that modifications can be made within the scope of the invention. For example, the fixed bias voltage generator 36 could comprise a programmable potentiometer or other form of programmable voltage source. Whilst the circuit illustrated is of an analogue nature, the circuit could be implemented using digital circuitry, an application specific integrated circuit (ASIC) or a microprocessor-based system using software.

What we claim is:

1. A method of operating an optical modulator of a type which has an optical attenuation versus voltage response which is cyclic, the optical modulator including an input to which the application of a bias voltage moves the modulator's response along the voltage axis, the method comprising the steps of:

generating a bias voltage which comprises the sum of a first and a second voltage component, wherein the first voltage component is fixed during normal operation and is selected to correspond to the expected bias voltage required for maintaining the modulator's response at a desired voltage position;

detecting the position of the modulator's response and adjusting the second voltage component to maintain the response at the desired voltage position;

detecting when the bias voltage approaches the limit of the available bias voltage range;

adjusting the first voltage component until it is equal to the sum of the bias voltage and a voltage corresponding to one or more half cycles of the modulator's response; and setting the second voltage component to zero.

2. The method, according to claim 1, and further comprising adjusting the first voltage component slowly enough for the second voltage component to track the change and thereby maintain the modulator's response at the desired voltage position until the second voltage component is set to zero.

3. The method, according to claim 1 and comprising: resetting the bias voltage by an amount which corresponds to an even number of half cycles of the modulator's response.

4. The method, according to claim 1 and comprising: resetting the bias voltage by an odd number of half cycles and inverting data applied to the modulator.

5. The method, according to claim 1, wherein when the format of data applied to the optical modulator includes overhead capacity the method further comprises setting the second voltage component to zero during the transmission of the overhead capacity.

6. The method, according to claim 5, wherein the format comprises a synchronous digital hierarchy (SDH) format comprising frames each of which comprises a plurality of payload and overhead data portions and the method comprises setting the second voltage component to zero during the transmission of the first overhead portion of the SDH frame.

7. The method, according to claim 6, and further comprising setting the second voltage component to zero in dependence on the SDH frame-rate signal.

8. An apparatus for operating an optical modulator of a type having an optical attenuation versus voltage response which is cyclic, the optical modulator including an input the application of a bias voltage to which moves the modulator's response along the voltage axis, the apparatus comprising:

a bias voltage generator for generating a bias voltage which comprises the sum of a first and a second voltage component, wherein the first voltage component is fixed during normal operation and is selected to correspond to the expected bias voltage required for maintaining the modulator's response at a desired voltage position;

means for detecting the position of the modulator's response and adjusting the second voltage component to maintain the response at the desired voltage position;

means for detecting when the bias voltage approaches the limit of the available bias voltage range;

means for adjusting the first voltage component until it is equal to the sum of the bias voltage and a voltage corresponding to one or more half cycles of the modulator's response; and means for setting the second voltage component to zero.

9. The apparatus, according to claim 8, wherein the means for adjusting the first component is operable to reset the bias voltage by an amount which corresponds to an even number of half cycles of the modulator's response.

10. The apparatus, according to claim 8, wherein the means for adjusting the first voltage component is operable to reset the bias voltage by an amount which corresponds to an odd number of half cycles of the modulator's response and further comprising means for inverting data applied to the modulator.

11. The apparatus, according to claim 8, wherein the means for adjusting the first voltage component is operable to adjust the first voltage component slowly enough for the second voltage component to track the change and thereby maintain the modulator's response at the desired voltage position.

12. The apparatus, according to claim 8, wherein the format of data applied to the modulator includes overhead capacity and wherein the means for setting the second voltage component is operable to set the second voltage component to zero during the transmission of the overhead capacity.

13. The apparatus, according to claim 12, wherein the format comprises a synchronous digital hierarchy (SDH) format comprising frames each of which comprises a plurality of payload and overhead data portions and wherein the means for setting the second voltage component to zero is operable during the transmission of the first overhead portion of the SDH frame.

14. The apparatus, according to claim 13, wherein said means is operable to set the second voltage component to zero in dependence on the SDH frame-rate signal.

15. The apparatus, according to claim 8, wherein the bias voltage generator comprises a first voltage component generator; a second voltage component generator and summing means for summing the two voltage components.

16. The apparatus, according to claim 15, wherein the second voltage component generator comprises two voltage generators and switching means for selectively switching between the voltage generators during resetting.

17. An apparatus, according to claim 8, wherein the optical modulator comprises a Mach Zehnder optical modulator.

18. An optical modulator incorporating apparatus according to claim 8.

19. In a synchronous digital hierarchy (SDH) telecommunications network of a type in which data is transmitted using an optical modulator which has an optical attenuation versus voltage response which is cyclic and which includes an input to which the application of a bias voltage moves the modulator's response along the voltage axis, a method of operating the optical modulator; comprising the steps of:

generating a bias voltage;

detecting the position of the modulator's response and adjusting the bias voltage to maintain the modulator's response at a desired voltage position;

detecting when the bias voltage approaches the limit of available bias voltage range; and resetting the bias voltage during an overhead portion of the SDH format by an amount corresponding to one or more half cycles of the modulator's response.

20. The method according to claim 19 and comprising resetting the bias voltage during the transmission of the first overhead portion of an SDH frame.

21. A method according to claim 19 comprising resetting the bias voltage in dependence on the SDH frame-rate signal.

22. The method according to claim 21 and further comprising suppressing any resulting out-of-frame (OOF) event being reported.

* * * * *